United States Patent
Yu

(10) Patent No.: US 11,405,384 B2
(45) Date of Patent: Aug. 2, 2022

(54) METHOD AND DEVICE OF REGULATING WEBSITE LOAD

(71) Applicant: SHANGHAI ZTE SOFTWARE CO., LTD., Shanghai (CN)

(72) Inventor: Peng Yu, Shanghai (CN)

(73) Assignee: SHANGHAI ZTE SOFTWARE CO., LTD., Shanghai (CN)

(*) Notice: Subject to any disclaimer, the term of this patent is extended or adjusted under 35 U.S.C. 154(b) by 349 days.

(21) Appl. No.: 16/620,057

(22) PCT Filed: Oct. 17, 2017

(86) PCT No.: PCT/CN2017/106534
§ 371 (c)(1),
(2) Date: Dec. 6, 2019

(87) PCT Pub. No.: WO2018/223579
PCT Pub. Date: Dec. 13, 2018

(65) Prior Publication Data
US 2020/0153816 A1 May 14, 2020

(30) Foreign Application Priority Data
Jun. 7, 2017 (CN) .......................... 201710423346.6

(51) Int. Cl.
*H04L 9/40* (2022.01)
*G06F 11/34* (2006.01)
*H04L 67/62* (2022.01)

(52) U.S. Cl.
CPC ...... *H04L 63/0838* (2013.01); *G06F 11/3433* (2013.01); *H04L 67/62* (2022.05)

(58) Field of Classification Search
CPC ............... H04L 67/0838; H04L 67/325; H04L 63/0838; H04L 67/62; H04L 67/1029; G06F 11/3433; G06F 9/505; G06F 9/5083
USPC ...................................... 709/223, 224; 726/5
See application file for complete search history.

(56) References Cited

U.S. PATENT DOCUMENTS

| | | | | |
|---|---|---|---|---|
| 7,721,303 | B2* | 5/2010 | Alves de Moura | G06F 8/38 709/202 |
| 9,396,599 | B1* | 7/2016 | Malhotra | H04W 12/08 |
| 10,223,729 | B2* | 3/2019 | Douglas | G06Q 10/063 |
| 10,282,763 | B1* | 5/2019 | Sulejmani | H04W 4/026 |

(Continued)

FOREIGN PATENT DOCUMENTS

| CN | 102710635 A | 10/2012 |
|---|---|---|
| CN | 102946334 A | 2/2013 |

(Continued)

OTHER PUBLICATIONS

WIPO, International Search Report dated Feb. 7, 2018.

*Primary Examiner* — Thu Ha T Nguyen
(74) *Attorney, Agent, or Firm* — Vivacqua Crane, PLLC

(57) ABSTRACT

Provided in the present disclosure are method, device, and apparatus of regulating a website load. The method includes: determining, by a server, a current load level of a website according to a current load of the website and a target value of the website load; and adjusting, by the server, login time of a client to regulate the website load according to the determined current load level of the website. The present disclosure enables load regulation of a website at an entry point of a site or a key service, thus improving user experience.

10 Claims, 5 Drawing Sheets

(56) References Cited

U.S. PATENT DOCUMENTS

| | | | |
|---|---|---|---|
| 10,810,636 B1* | 10/2020 | Sulejmani | H04W 4/027 |
| 11,109,214 B1* | 8/2021 | Claybrook | H04L 63/08 |
| 11,127,054 B1* | 9/2021 | Sulejmani | H04W 4/029 |
| 2002/0010776 A1* | 1/2002 | Lerner | H04L 69/329 |
| | | | 709/225 |
| 2002/0152304 A1* | 10/2002 | Collazo | H04L 41/042 |
| | | | 709/224 |
| 2004/0128346 A1* | 7/2004 | Melamed | H04L 29/06 |
| | | | 709/203 |
| 2008/0301318 A1* | 12/2008 | McCue | H04L 65/65 |
| | | | 704/E11.003 |
| 2010/0036933 A1* | 2/2010 | Breau | G06F 16/951 |
| | | | 709/218 |
| 2010/0174551 A1* | 7/2010 | Kiley | G16Z 99/00 |
| | | | 705/5 |
| 2010/0299763 A1* | 11/2010 | Marcus | G06Q 10/06 |
| | | | 726/30 |
| 2011/0154454 A1* | 6/2011 | Frelechoux | H04L 63/0892 |
| | | | 726/5 |
| 2011/0184743 A1* | 7/2011 | Trollman | G06Q 10/10 |
| | | | 705/1.1 |
| 2011/0185401 A1* | 7/2011 | Bak | G06F 16/9024 |
| | | | 726/5 |
| 2012/0084455 A1* | 4/2012 | McCue | H04N 21/4394 |
| | | | 709/231 |
| 2013/0080635 A1* | 3/2013 | Ho | H04L 67/32 |
| | | | 709/225 |
| 2013/0159494 A1* | 6/2013 | Danda | H04L 41/147 |
| | | | 709/224 |
| 2014/0201838 A1* | 7/2014 | Varsanyi | H04L 63/1425 |
| | | | 726/23 |
| 2016/0364114 A1* | 12/2016 | Von Dehsen | G06F 3/04817 |
| 2017/0237790 A1* | 8/2017 | Patel | H04M 15/66 |
| | | | 709/203 |
| 2017/0332307 A1 | 11/2017 | Pan | |
| 2018/0097913 A1* | 4/2018 | Smith | G06F 16/252 |
| 2018/0288063 A1* | 10/2018 | Koottayi | H04L 63/1416 |
| 2019/0173690 A1* | 6/2019 | McCue | H04L 43/08 |
| 2019/0182155 A1* | 6/2019 | Chang | H04L 45/74 |
| 2020/0145385 A1* | 5/2020 | Chauhan | H04L 67/568 |
| 2021/0329064 A1* | 10/2021 | Sevim | H04L 67/1008 |

FOREIGN PATENT DOCUMENTS

| | | |
|---|---|---|
| CN | 105426773 A | 3/2016 |
| CN | 105682093 A | 6/2016 |

* cited by examiner

METHOD AND DEVICE OF REGULATING WEBSITE LOAD

This application is a US National Stage of International Application No. PCT/CN2017/106534, filed on Oct. 17, 2017, designating the United States, and claiming the benefit of Chinese Patent Application No. 201710423346.6, filed with the Chinese Patent Office on Jun. 7, 2017, and entitled "Method and device of regulating website load", both of which are hereby incorporated by reference in their entireties.

FIELD

The present disclosure relates to the field of internet technologies and particularly to a method and a device of regulating a website load.

BACKGROUND

With continuously increase of popularity of a website, visits to the website rises gradually, the website is under an increasing pressure, and the website load is increasingly heavier, so that user experience is increasingly worse, until the website crashes.

In order to solve the problem that the website load is increasingly heavier, it can be solved by updating hardware and software of a website server on one hand, and can be solved by various clustering techniques on the other hand. However, if the website load is light, it demonstrates many resources are wasted. Only when the website load reaches a more suitable value, i.e., a target value of the website load, a balance between the user experience and the resource utilization can be achieved. In other words, if the website load is heavy, the website reacts slowly and the user experience of the website is poor after the user enters the website, and the website load cannot be regulated at entrance of the website or entrance of key services; if the website load is light, there is a need to increase the resource utilization, and the website load cannot be regulated at the entrance of the website or the entrance of the key services.

SUMMARY

A method and a device of regulating the website load provided according to embodiments of the present disclosure may solve the problem of regulating the website load at the entrance of the website or the entrance of the key services.

A method of regulating a website load provided according to an embodiment of the present disclosure includes: determining, by a server, a current load level of a website according to a current load of the website and a target value of the website load; and adjusting, by the server, login time of a client to regulate the website load according to the determined current load level of the website.

A device of regulating a website load provided according to an embodiment of the present disclosure includes: a load state determining module configured to determine a current load level of a website according to a current load of the website and a target value of the website load; and a load regulating module configured to adjust login time of a client to regulate the website load according to the determined current load level of the website.

An apparatus of regulating a website load provided according to an embodiment of the present disclosure includes: a memory; and a processor coupled to the memory and configured to determine a current load level of a website according to a current load of the website and a target value of the website load, and adjust login time of a client to regulate the website load according to the determined current load level of the website.

The technical solutions provided according to the embodiments of the present disclosure have the following beneficial effects: the embodiments of the present disclosure improves the user experience by reasonably regulating the website load at the entrance of the website or the entrance of the key services, and can also avoid wasting more hardware and software resources, so as to facilitate the balance between the user experience and the resource utilization.

DETAILED DESCRIPTION OF THE EMBODIMENTS

The embodiments of the present disclosure will be illustrated below in details in combination with the accompanying drawings, and it should be understood that the embodiments illustrated below are only used to illustrate and explain the present disclosure but not to limit the present disclosure.

The embodiments of the present disclosure is applicable to a scene where a website load rises instantaneously, a scene where the website load is low, or a scene where the website administrator needs to regulate the website load, and can be widely applied to all kinds of websites needing to regulate the website load, such as a shopping website (e.g., Jingdong Mall), a ticket website (e.g., 12306), a service organization website and the like. In an exemplarily application, a website server adjusts login time of a user during which the user implements a current verification of a verification code at a client by interacting with the client running on a terminal according to a current load level of the website, to thereby implement regulation of the website load.

First Embodiment

Figure 1:
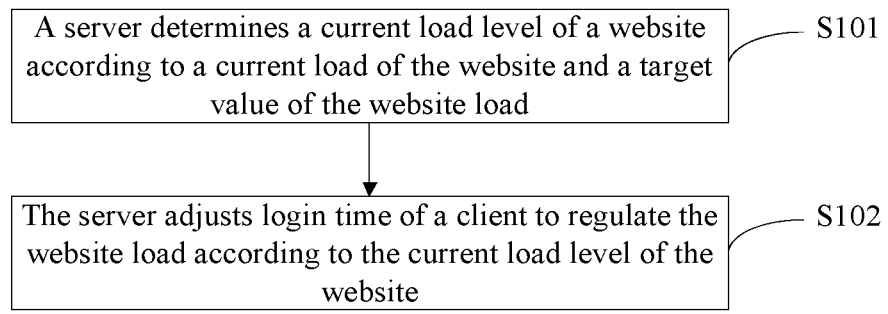
FIG. 1 is a flow chart of a method of regulating a website load according to a first embodiment of the present disclosure.

FIG. 1 is a flow chart of a method of regulating a website load according to the first embodiment of the present disclosure, and as shown in FIG. 1, the method includes the following steps.

In step S101, a server determines a current load level of a website according to a current load of the website and a target value of the website load.

When the website load reaches the target value of the website load, a balance between the user experience and the resource utilization is achieved. Therefore the target value of the website load may be used as a threshold for judging whether the website load is heavy or light. Exemplarily, when the client requests to login the website or a website service, the current load of the website and the target value of the website load is compared. The current load level of the website is determined as heavy load if the current load of the website is greater than the target value of the website load. It is determined that the current load of the website is balanced if the current load of the website is equal to the target value of the website load. The current load level of the website is determined as light load if the current load of the website is less than the target value of the website load.

Here the above-mentioned website load may be a real-time value when the client requests to login the website or website service, or may be an average load value obtained by a timing scan of a timer during a time period of the timer.

In step S102, the server adjusts login time of the client to regulate the website load according to the determined current load level of the website.

A verification code is a common full-automatic program for distinguishing whether the user is a computer or a person. By using the verification code, malicious password cracking, brushing ticket and bumping in a forum can be prevented, and effectively prevent a hacker from performing continuous login attempts for a particular registered user by way of brute force attack through a particular program. Actually the verification code is now a common way for many websites, and this function can be implemented in a simpler manner. For example, a series of problems are generated, which can be generated and judged by a computer and must be answered only by a person. With development of computer technologies, a behavioral verification code occurs. Literally, the verification is carried out through an operation behavior of a user without reading characters on a distorted picture. There are two common types for such verification: drag type and point touch type. The verification code of drag type is similar to swip unlock of a phone, where a mouse is used to drag a slide block to a specified position according to a prompt to complete the verification; for the verification code of point touch type, according to a text prompt, clicking a position consistent with the text description in a picture to complete the verification.

In the present embodiment, the verification code can be utilized to adjust the login time of the client at the entrance of the website or the entrance of the key services, to thereby regulate the website load. Firstly the server determines a standard time required to complete a current verification of the verification code according to a determined current load level of the website. Specifically, if the server determines the current load level of the website as the heavy load, a sum of a standard time required to complete a previous verification of the verification code and a first stepping time is taken as the standard time required to complete the current verification of the verification code; if the server determines that the current load of the website is balanced, the standard time required to complete the previous verification of the verification code is taken as the standard time required to complete the current verification of the verification code; if the server determines the current load level of the web site as the light load, a difference between the standard time required to complete the previous verification of the verification code and a second stepping time is taken as the standard time required to complete the current verification of the verification code. Further, if the client is the first client requesting to login the website or website service, a preset standard time is taken as the standard time required to complete the current verification of the verification code. The first stepping time is determined by the server according to the difference value between the current load of the website and the target value of the website load, when the website is heavily loaded, and the second stepping time is determined by the server according to a difference value between the current load of the website and the target value of the website load, when the website is lightly loaded. Then, a set of verification codes is selected from a candidate verification code group in accordance with the standard time required to complete the current verification of the verification code, and the set of verification codes is used to adjust the login time of the client. Specifically, the selected set of verification codes may be a simple verification code or a combination of many simple verification codes. The number of the verification codes in a set of verification codes is related to the verification time required to complete the current verification of the verification code. That is to say, the heavier the website load is, the longer the verification time required to complete the current verification of the verification code is, the larger the number of the verification codes in the selected set of verification codes is, and thus input time taken by the verification after the client receives the verification code is longer, which extends the login time of the client (i.e., the time for loginning the website or website service); and on the contrary, the lighter the website load is, the shorter the verification time required to complete the current verification of the verification code is, the smaller the number of the verification codes in the selected set of verification codes is, and thus the input time taken by the verification after the client receives the verification code is shorter, which shortens the login time of the client (i.e., the time for loginning the website or website service), implementing a change in the input time of the verification code along with the website load as well as a change in the login time of the client along with the input time of the verification code. In other words, since the login time of the client is regulated at the entrance of the website or the entrance of the key services, unit time visit from new clients to the website or the key services is reduced, to thereby implement the regulation of the website load.

It should be noted that before performing step S101, multiple sets of verification codes need to be obtained as the candidate verification code group by combining one or more forms of the verification codes, and a standard time range required to complete a verification of each of the sets of verification codes is determined.

It should be noted that after performing step S102, whether to allow the client to login and access the website or website service is determined according to a verification result of the set of verification codes by the client and the time during which the client completes the verification of the set of verification codes.

Second Embodiment

Figure 2:
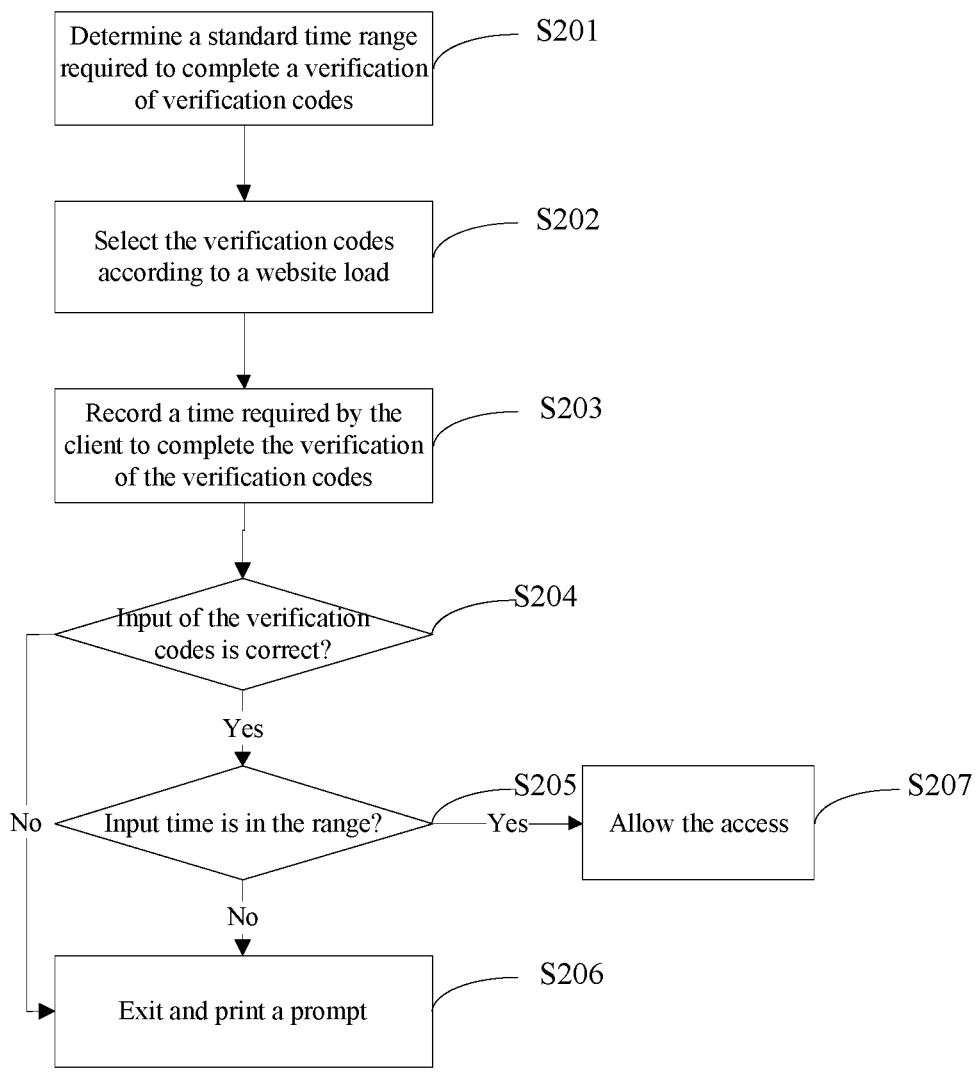
FIG. 2 is a flow chart of a method of regulating a website load according to a second embodiment of the present disclosure.

FIG. 2 is a flow chart of a method of regulating a website load according to the second embodiment of the present disclosure, and as shown in FIG. 2, the method includes the following steps.

In step S201, various combinations of verification codes are generated by using traditional verification codes and behavioral verification codes, a standard time range required to complete a verification of each of the various combinations of verification codes is determined by testing, and verification codes that are not easily recognized by humans are removed.

In step S202, a standard time required to complete the verification of the verification codes is calculated according to a website load when a client requests the verification codes from a server, where the obtained standard time is longer when the website load is heavier, and the obtained standard time is shorter when the website load is lighter. A set of verification codes is selected from candidate combinations of the verification codes in accordance with the standard time and returned to the client.

In step S203, the time required by the client to complete the verification of the verification codes is recorded.

In step S204, it is judged whether the verification of the verification codes is correct, and if so, step S205 is performed, otherwise step S206 is performed.

In step S205, it is judged whether an input time is in the standard time range, and if the input time is not in the standard time range required to complete the verification of the verification codes, step S206 is performed; if the input time is in the range, step S207 is performed.

In step S206, the verification fails, and a relative prompt is given.

In step S207, the verification succeeds, and the access is allowed.

As can be seen, according to the embodiments of the present disclosure, the verification codes can be used to regulate the website load and improve the user experience.

Third Embodiment

Figure 3:
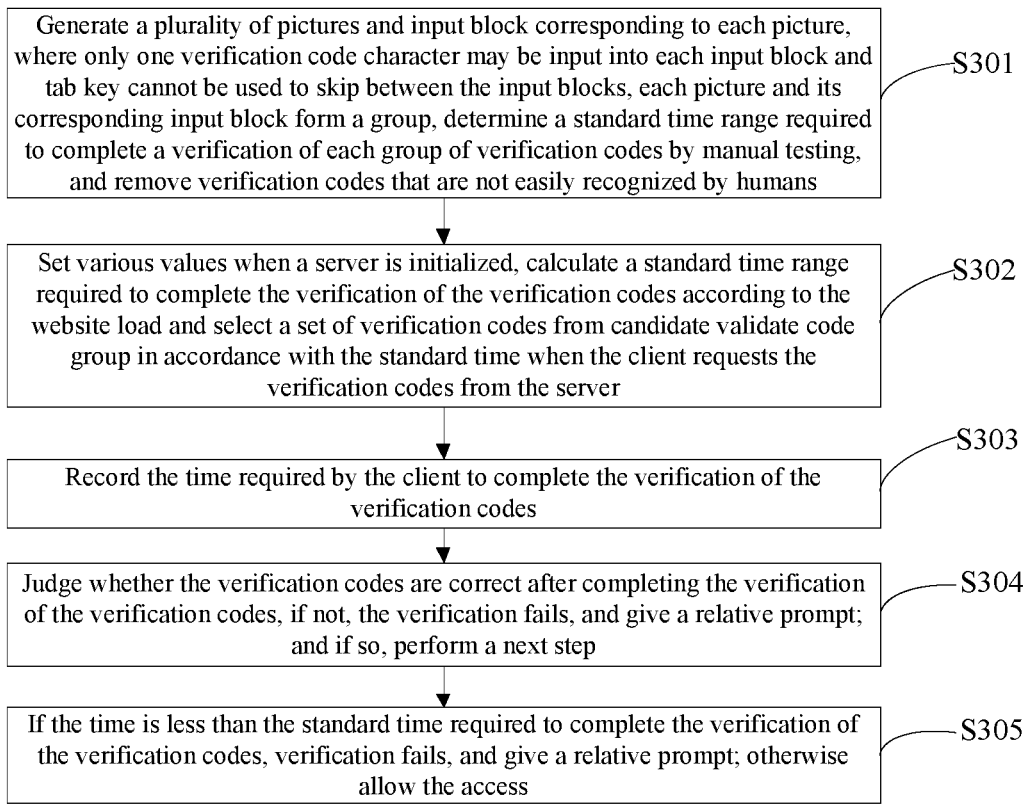
FIG. 3 is a flow chart of a method of regulating a website load according to a third embodiment of the present disclosure.

FIG. 3 is a flow chart of a method of regulating a website load according to the third embodiment of the present disclosure, and as shown in FIG. 3, the method includes the following steps.

In step S301, a plurality of pictures and input block corresponding to each picture are generated, where only one verification code character may be input into each input block and the tab key may not be used to skip between the input blocks, each picture and its corresponding input block form a group, a standard time range required to complete a verification of each group of verification codes is determined by manual testing, and verification codes that are not easily recognized by humans are removed.

In S302, an initial value of a standard time required to complete the verification of the verification codes, a target value of a website load and stepping time are set when the server is initialized. The client obtains a current value of the website load when requesting the verification codes from the server. If a request received by the server is the first request, the initial value of the standard time required to complete the verification of the verification codes is used as the standard time required to complete the verification of the verification codes. If the request received by the server is not the first request, the obtained current value of the website load is compared with the target value of the website load. If the current value is less than the target value, a result of the standard time required to complete the previous verification of the verification codes minus the stepping time is taken as the standard time required to complete the current verification of the verification codes; if the current value is greater than the target value, a result of the standard time required to complete the previous verification of the verification codes plus the stepping time is taken as the standard time required to complete the current verification of the verification codes; if the current value is equal to the target value, the standard time required to complete the previous verification of the verification codes is taken as the standard time required to complete the verification of the verification codes. A set of verification codes is selected from a candidate verification code group in accordance with the standard time required to complete the current verification of the verification codes and returned to the client.

It should be noted that the stepping time provided in step S302 is not a fixed value, and is determined according to a difference between the current value of the website load and the target value of the website load. Generally, the smaller the difference value is, the shorter the stepping time is, and the larger the difference value is, the longer the stepping time is.

In the step S303, the time required by the client to complete the verification of the verification codes is recorded.

In step S304, it is judged whether the verification codes are correct after completing the verification of the verification codes, if not, the verification fails, and a relative prompt is given; and if so, a next step is performed.

In step S305, if the time is not in the standard time range required to complete the verification of the verification codes, the verification fails, and a relative prompt is given; otherwise the access is allowed.

According to the embodiment of the present disclosure, the verification codes are used to regulate the website load at the entrance of the website or the entrance of the key services and improves the user experience.

Fourth Embodiment

Figure 4:
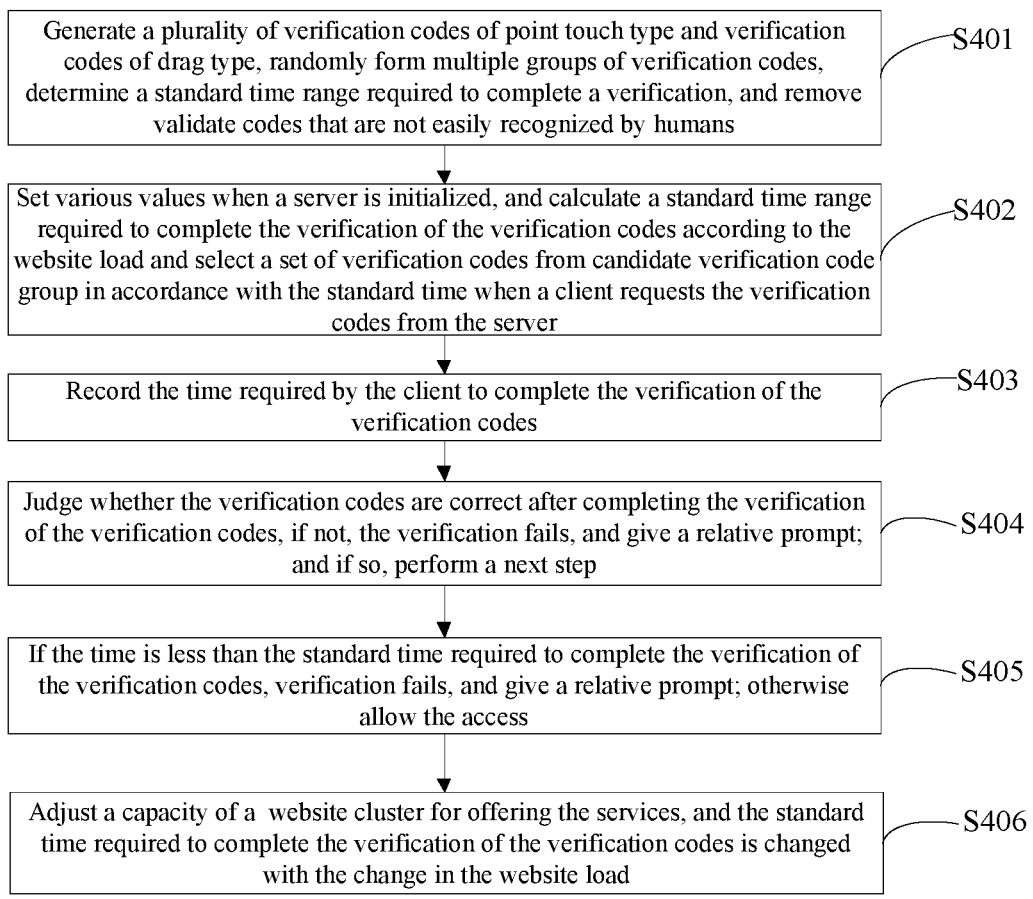
FIG. 4 is a flow chart of a method of regulating a website load according to a fourth embodiment of the present disclosure.

FIG. 4 is a flow chart of a method of regulating a website load according to the fourth embodiment of the present disclosure, and as shown in FIG. 4, the method includes the following steps.

In step S401, a plurality of verification codes of point touch type and verification codes of drag type are generated, multiple groups of verification codes are randomly formed, a standard time range required to complete the verification is determined, and verification codes that are not easily recognized by humans are removed.

In step S402, an initial value of a standard time required to complete the verification of the verification codes, a target value of a website load and stepping time are set when the server is initialized. The client obtains a current value of the website load when requesting the verification codes from the server. If a request received by the server is the first request, the initial value of the standard time required to complete the verification of the verification codes is used as the standard time required to complete the verification of the verification codes. If the request received by the server is not the first request, the obtained current value of the website load is compared with the target value of the website load. If the current value is less than the target value, a result of the standard time required to complete the previous verification of the verification codes minus the stepping time is taken as the standard time required to complete the current verification of the verification codes; if the current value is greater than the target value, a result of the standard time required to complete the previous verification of the verification codes plus the stepping time is taken as the standard time required to complete the current verification of the verification codes; if the current value is equal to the target value, the standard time required to complete the previous verification of the verification codes is taken as the standard time required to complete the current verification of the verification codes. A set of verification codes is selected from a candidate verification code group in accordance with the standard time required to complete the current verification of the verification codes and returned to the client.

It should be noted that the stepping time provided in step S402 is not a fixed value, and is determined according to a difference between the current value of the website load and the target value of the website load. Generally, the smaller the difference value is, the shorter the stepping time is, and the larger the difference value is, the longer the stepping time is. Further, a reference table of the website load, the target value of the website load and the stepping time may be created, or a reference table of the difference value and the stepping time may be created. Thus, the server may determine a corresponding stepping time by searching for the reference table.

In step S403, the time required by the client to complete the verification of the verification codes is recorded.

In step S404, it is judged whether the verification codes are correct after completing the verification of the verification codes, if not, the verification fails, and a relative prompt is given; and if so, a next step is performed.

In step S405, if the time is not in the standard time range required to complete the verification of the verification codes, the verification fails, and a relative prompt is given; otherwise the access is allowed.

In step S406, a capacity of a website cluster for offering the services is reduced, where the website load rises and tends to the target value of the website load through step S403 gradually to increase the standard time required to complete the verification of the verification codes; the capacity of the website cluster for offering the services is expanded, where the website load reduces and tends to the load target value through step S403 gradually to shorten the standard time required to complete the verification of the verification codes.

Fifth Embodiment

Figure 5:
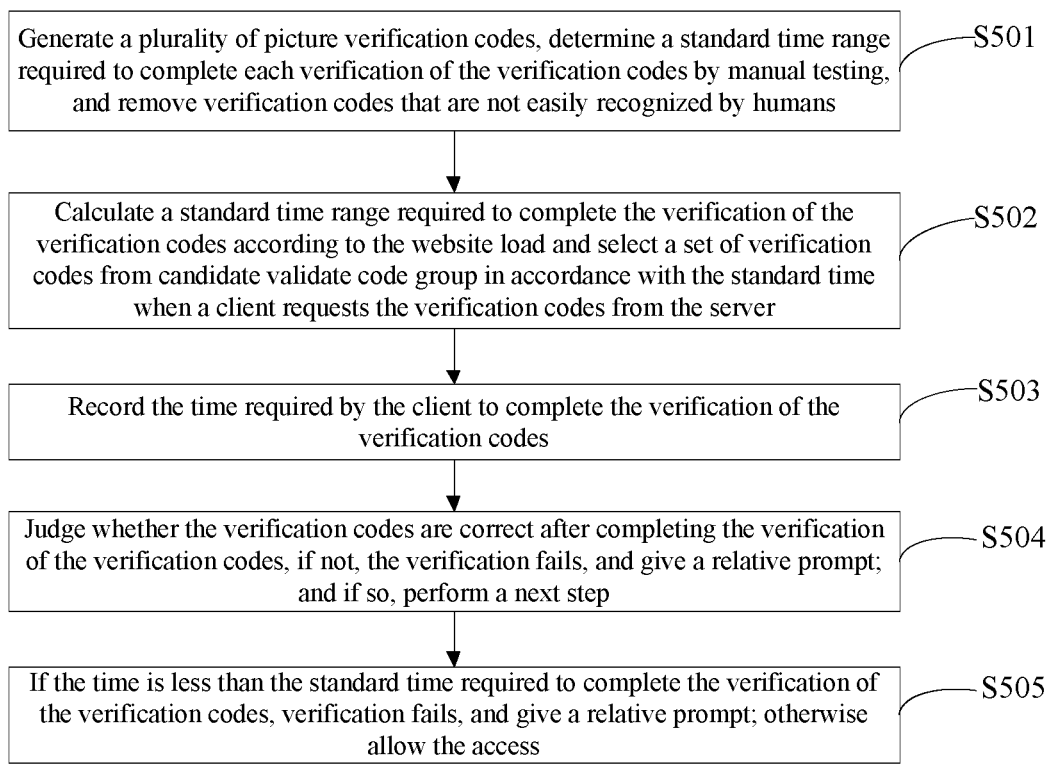
FIG. 5 is a flow chart of a method of regulating a website load according to a fifth embodiment of the present disclosure.

FIG. 5 is a flow chart of a method of regulating a website load according to the fifth embodiment of the present disclosure, and as shown in FIG. 5, the method includes the following steps.

In step S501, a plurality of picture verification codes are generated, a standard time range required to complete each verification of the verification codes is determined by manual testing, and verification codes that are not easily recognized by humans are removed.

In step S502, a standard time required to complete the verification of the verification codes is calculated according to a website load when a client requests the verification codes from a server, where the obtained standard time is longer when the website load is heavier, and the obtained standard time is shorter when the website load is lighter. A verification code is selected from candidate verification codes in accordance with the standard time and returned to the client.

In step S503, the time required by the client to complete the verification of the verification codes is recorded.

In step S504, it is judged whether the verification codes are correct after completing the verification of the verification codes, if not, the verification fails, and a relative prompt is given; and if so, a next step is performed.

In step S505: if the time is not in the standard time range required to complete the verification of the verification codes, the verification fails, and a relative prompt is given; otherwise the access is allowed.

Sixth Embodiment

Figure 6:
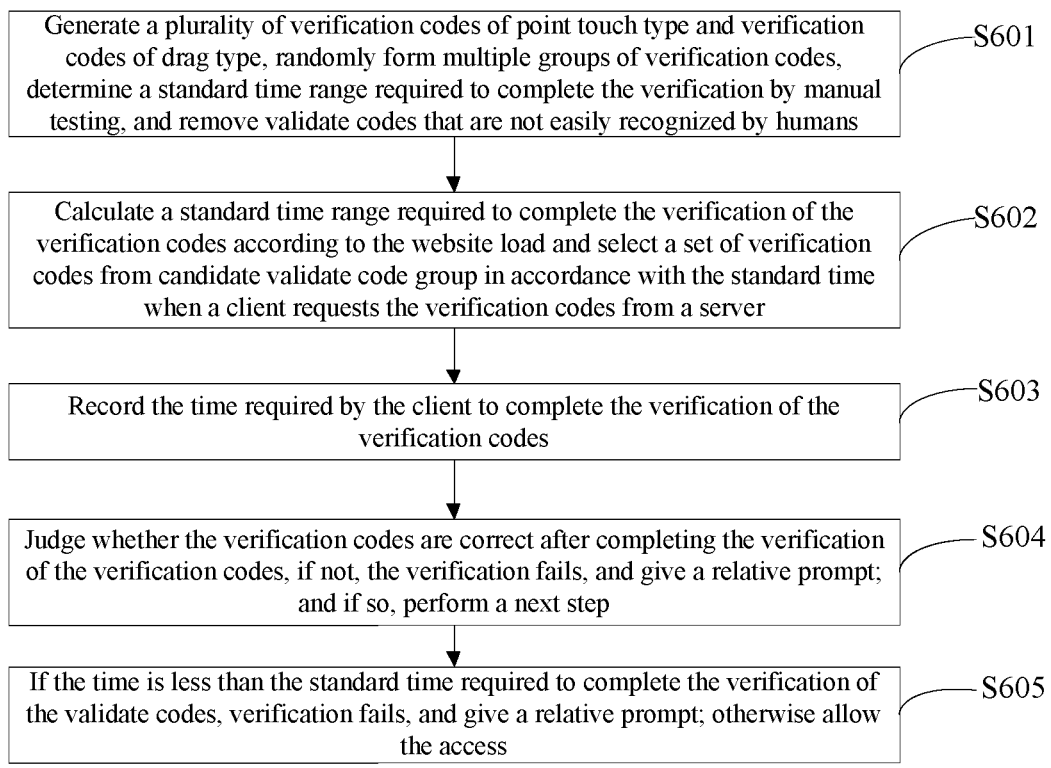
FIG. 6 is a flow chart of a method of regulating a website load according to a sixth embodiment of the present disclosure.

FIG. 6 is a flow chart of a method of regulating a website load according to the sixth embodiment of the present disclosure, and as shown in FIG. 6, the method includes the following steps.

In step S601, a plurality of verification codes of point touch type and verification codes of drag type are generated, multiple groups of verification codes are randomly formed, a standard time range required to complete the verification is determined by manual testing, and verification codes that are not easily recognized by humans are removed.

In step S602, a standard time required to complete the verification of the verification codes is calculated according to a website load when a client requests the verification codes from a server, where the obtained standard time is longer when the website load is heavier, and the obtained standard time is shorter when the website load is lighter. A set of verification codes is selected from candidate verification code group in accordance with the standard time.

In step S603, the time required by the client to complete the verification of the verification codes is recorded.

In step S604, it is judged whether the verification codes are correct after completing the verification of the verification codes, if not, the verification fails, and a relative prompt is given; and if so, a next step is performed.

In step S605, if the time is not in the standard time range required to complete the verification of the verification codes, the verification fails, and a relative prompt is given; otherwise the access is allowed.

It can be understood by those ordinary skilled in the art that the implementation of all or a part of the steps in the methods of the above-mentioned embodiments may be implemented by program instructions with relevant hardware. The program may be stored in a computer readable storage medium, and include steps S101-S102 or S201-S207 or S301-S305 or S401-S406 or S501-S505 or S601-S605 when being executed. That is to say, the present disclosure may further provide a storage medium storing a computer program which, when executed by a processor, cause the processor to implement at least steps of: determining a current load level of a website according to a current load of the website and a target value of the website load; and adjusting login time of a client to regulate the website load according to the determined current load level of the website. Here the storage medium may include ROM/RAM, diskette, compact disc, U disc.

Seventh Embodiment

Figure 7:
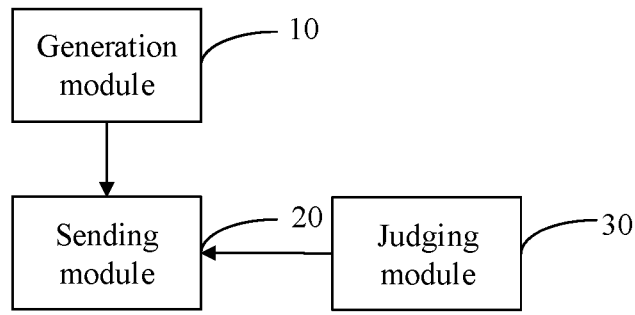
FIG. 7 is a structure block diagram of a device of regulating a website load according to a seventh embodiment of the present disclosure.

FIG. 7 is a structure block diagram of a device of regulating a website load according to the seventh embodiment of the present disclosure, and as shown in FIG. 7, the device includes:

a generation module 10, a sending module 20 and a judging module 30.

The generation module 10 is configured to generate a verification code combination and determine a standard time range required to complete a verification of the verification code.

The sending module 20 is configured to send the verification code to a client according to the website load and record the time required by the client to complete the verification of the verification code.

The judging module 30 is configured to judge whether the verification of the verification code is correct and whether the verification time is in the standard time range.

The work flow of the device includes: the generation module 10 pre-generates the verification code combination and determines the standard time range required to complete the verification of the verification code combination. When the client requests the verification codes from a server, the sending module 20 sends the corresponding verification code combination to the client according to the website load. Exemplarily, the heavier the website load is, the larger the number of the verification codes in the sent verification code combination, so as to extend the time taken by the verification of the client. After the client completes the verification, the judging module 30 judges the verification result of the client. If the verification of the verification code combination is correct and the time taken by the verification is in the standard time range, it is judged that the client passes the verification and is allowed to login the website or web site service.

In the implementation of this embodiment, all the modules can be implemented by the processor of the server.

Eighth Embodiment

Figure 8:
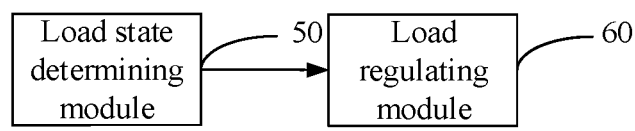
FIG. 8 is a structure block diagram of a device of regulating a website load according to an eighth embodiment of the present disclosure.

FIG. 8 is a structure block diagram of a device of regulating a website load according to the eighth embodiment of the present disclosure, and as shown in FIG. 8, the device includes: a load state determining module 50 and a load regulating module 60.

The load state determining module 50 is configured to determine a current load level of a website according to a current load of the website and a target value of the website load.

The load regulating module 60 (for implementing functions of the sending module 20 and the judging module 30 of the embodiment shown in FIG. 7) is configured to adjust login time of a client to regulate the website load according to the determined current load level of the web site.

The work flow of the device includes: when the client requests to login the website or website service, the current load of the website and the target value of the website load is compared; if the current load of the website is greater than the target value of the website load, the load state determining module 50 determines the current load level of the website as heavy load, and then the load regulating module 60 takes a result of the standard time required to complete the previous verification of the verification codes plus a stepping time determined according to the website load and the target value of the website load as the standard time required to complete the current verification of the verification codes, selects a set of verification codes from candidate verification code group in accordance with the standard time and sends it to the client, and finally receives the verification result of the set of verification codes by the client and determines whether the client is allowed to login and access the website or website service according to the verification result and the time taken by the client to complete the verification of the set of verification codes; if the current load of the website is equal to the target value of the website load, the load state determining module 50 determines the current load of the website is balanced, and then the load regulating module 60 takes the standard time required to complete the previous verification of the verification codes as the standard time required to complete the current verification of the verification codes, selects a set of verification codes from the candidate verification code group in accordance with the standard time and sends it to the client, and finally receives the verification result of the set of verification codes by the client and determines whether the client is allowed to login and access the website or website service according to the verification result and the time taken by the client to complete the verification of the set of verification codes; if the current load of the website is less than the target value of the website load, the load state determining module 50 determines the current load level of the website as light load, and then the load regulating module 60 takes a result of the standard time required to complete the previous verification of the verification codes minus a stepping time determined according to the website load and the target value of the website load as the standard time required to complete the current verification of the verification codes, selects a set of verification codes from the candidate verification code group in accordance with the standard time and sends it to the client, and finally receives the verification result of the set of verification codes by the client and determines whether the client is allowed to login and access the website or website service according to the verification result and the time taken by the client to complete the verification of the set of verification codes. That is to say, the load regulating module 60 calculates the standard time required to complete the current verification of the verification codes according to the current condition of the website load, selects a set of verification codes from the candidate verification code group, and utilizes the set of verification codes to adjust the login time of the client.

Here, a first stepping time is determined by the server according to a difference value between the current load of the website and the target value of the website load when the website is heavily loaded, and a second stepping time is determined by the server according to the difference value between the current load of the website and the target value of the website load when the website is lightly loaded.

It should be noted that the load regulating module 60 takes a preset standard time as the standard time required to complete the current verification of the verification codes if the client is the first client requesting to login the web site or website service.

The present embodiment further includes: a verification code generation module (for implementing function of the generation module 10 of the embodiment shown in FIG. 7) configured to obtain multiple sets of verification codes as the candidate verification code group by combining one or more forms of verification codes and determine the standard time range required to complete a verification of each of the sets of verification codes before the client requests to login the web site or website service.

Ninth Embodiment

The embodiment provides an apparatus of regulating a website load including: a processor configured to determine a current load level of a website according to a current load of the website and a target value of the website load, and adjust login time of a client to regulate the website load according to the determined current load level of the website; and a memory coupled to the processor and storing a program executed by the processor.

To sum up, the embodiments of the present disclosure have the following beneficial effects: 1. according to the embodiments of the present disclosure, at the entrance of the website or the entrance of the key services, the website load is used for calculating the standard time required to complete the verification of the verification code, and a combination of the verification codes is selected based on the standard time; 2. according to the embodiments of the present disclosure, there is no need of a complex design of the verification code which cannot be identified by the human, and a purpose of extending the verification time is achieved by combining simple verification codes.

While the present disclosure has been illustrated above in details, the present disclosure is not limited thereto and those skilled in the art can make various modifications according to the principle of the present disclosure. Thus all the modifications made according to the principle of the present disclosure should be understood as falling into the protection scope of the present disclosure.

The invention claimed is:

1. A method of regulating a website load, comprising:
comparing, by a server, a current load of the website and a target value of the website load when the client requests to login the website or a website service to determine a current load level of a website;
determining, by the server, standard time required to complete a current verification of a verification code according to the determined current load level of the website, comprising:
in response to the current load of the website being greater than the target value of the website load, taking, by the server, a sum of standard time required to complete a previous verification of a verification code and a first stepping time as the standard time required to complete the current verification of the verification code;
in response to the current load of the website being equal to the target value of the website load, taking, by the server, standard time required to complete a previous verification of a verification code as the standard time required to complete the current verification of the verification code; and
in response to the current load of the website being less than the target value of the website load, taking, by the server, a difference between standard time required to complete a previous verification of a verification code and a second stepping time as the standard time required to complete the current verification of the verification code;
selecting, by the server, a set of verification codes from a candidate verification code group in accordance with the standard time; and
using, by the server, the set of verification codes to adjust the login time of a client to regulate the website load according to the determined current load level of the website;
wherein the first stepping time is determined by the server according to a difference value between the current load of the website and the target value of the website load, when the current load of the website is greater than the target value of the website load; and
the second stepping time is determined by the server according to a difference value between the current load of the website and the target value of the website load, when the current load of the website is less than the target value of the website load.

2. The method according to claim 1, further comprising:
in response to determining the client is the first client requesting to login the website or the website service, taking a preset standard time as the standard time required to complete the current verification of the verification code.

3. The method according to claim 2, before the client requesting to login the website or the website service, further comprising:
obtaining multiple sets of verification codes as the candidate verification code group by combining one or more forms of verification codes; and
determining a standard time range required to complete a verification of each of the sets of verification codes.

4. The method according to claim 1, before the client requesting to login the website or the website service, further comprising:
obtaining multiple sets of verification codes as the candidate verification code group by combining one or more forms of verification codes; and
determining a standard time range required to complete a verification of each of the sets of verification codes.

5. The method according to claim 4, further comprising:
determining whether to allow the client to login and access the website or the website service according to a verification result of the set of verification codes by the client and time during which the client completes a verification of the set of verification codes.

6. An apparatus of regulating a website load, comprising:
a memory; and
a processor coupled to the memory, and configured to
compare a current load of the website and a target value of the website load when the client requests to login the website or a website service to determine a current load level of a website;
determine standard time required to complete a current verification of a verification code according to the determined current load level of the website, comprising:
in response to the current load of the website being greater than the target value of the website load, take a sum of standard time required to complete a previous verification of a verification code and a first stepping time as the standard time required to complete the current verification of the verification code;
in response to the current load of the website being equal to the target value of the website load, take standard time required to complete a previous verification of a verification code as the standard time required to complete the current verification of the verification code; and
in response to the current load of the website being less than the target value of the website load, take a difference between standard time required to complete a previous verification of a verification code and a second stepping time as the standard time required to complete the current verification of the verification code;
select a set of verification codes from a candidate verification code group in accordance with the standard time; and
use the set of verification codes to adjust login time of a client to regulate the website load according to the determined current load level of the website;
wherein the first stepping time is determined by the server according to a difference value between the current load of the website and the target value of the website load, when the current load of the website is greater than the target value of the website load; and the second stepping time is determined by the server according to a difference value between the current load of the website and the target value of the website load, when the current load of the website is less than the target value of the website load.

7. The apparatus according to claim 6, wherein the processor is configured:
in response to determining the client is the first client requesting to login the website or the website service, to take a preset standard time as the standard time required to complete the current verification of the verification code.

8. The apparatus according to claim 6, wherein before the client requesting to login the website or the website service, the processor is configured:
to obtain multiple sets of verification codes as the candidate verification code group by combining one or more forms of verification codes; and
to determine a standard time range required to complete a verification of each of the sets of verification codes.

9. The apparatus according to claim 8, wherein the processor is configured determine whether to allow the client to login and access the website or the website service according to a verification result of the set of verification codes by the client and time during which the client completes a verification of the set of verification codes.

10. A non-transitory computer-readable storage medium storing instructions which cause, when executed by a processor, the processor to
compare a current load of the website and a target value of the website load when the client requests to login the website or a website service to determine a current load level of a website;
determine standard time required to complete a current verification of a verification code according to the determined current load level of the website, comprising:
  in response to the current load of the website being greater than the target value of the website load, take a sum of standard time required to complete a previous verification of a verification code and a first stepping time as the standard time required to complete the current verification of the verification code;
  in response to the current load of the website being equal to the target value of the website load, take standard time required to complete a previous verification of a verification code as the standard time required to complete the current verification of the verification code; and
  in response to the current load of the website being less than the target value of the website load, take a difference between standard time required to complete a previous verification of a verification code and a second stepping time as the standard time required to complete the current verification of the verification code;
select a set of verification codes from a candidate verification code group in accordance with the standard time; and
use the set of verification codes to adjust login time of a client to regulate the website load according to the determined current load level of the website;
wherein the first stepping time is determined by the server according to a difference value between the current load of the website and the target value of the website load, when the current load of the website is greater than the target value of the website load; and
the second stepping time is determined by the server according to a difference value between the current load of the website and the target value of the website load, when the current load of the website is less than the target value of the website load.

* * * * *